United States Patent
Graham

(10) Patent No.: US 9,449,348 B2
(45) Date of Patent: Sep. 20, 2016

(54) PROVIDING A LOCALITY VIEWPORT THROUGH A SOCIAL NETWORKING SYSTEM

(75) Inventor: Adrian Graham, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 815 days.

(21) Appl. No.: 13/597,054

(22) Filed: Aug. 28, 2012

(65) Prior Publication Data

US 2014/0068459 A1    Mar. 6, 2014

(51) Int. Cl.
*G06Q 50/00* (2012.01)

(52) U.S. Cl.
CPC ........................... *G06Q 50/01* (2013.01)

(58) Field of Classification Search
CPC .............. G06F 17/3087; G06F 17/30867; G06Q 50/01; G06Q 30/0251–30/0271; H04L 67/22
See application file for complete search history.

(56) References Cited

U.S. PATENT DOCUMENTS

| | | | |
|---|---|---|---|
| 8,005,906 B2 * | 8/2011 | Hayashi | G06F 17/30867 709/203 |
| 2004/0128215 A1 * | 7/2004 | Florance et al. | 705/28 |
| 2007/0162432 A1 * | 7/2007 | Armstrong et al. | 707/3 |
| 2007/0185858 A1 * | 8/2007 | Lu | G06F 17/30864 |
| 2009/0281988 A1 * | 11/2009 | Yoo | 707/3 |
| 2010/0057539 A1 * | 3/2010 | Allen | 705/10 |
| 2010/0318551 A1 * | 12/2010 | Lai | 707/765 |
| 2012/0166432 A1 * | 6/2012 | Tseng | 707/728 |
| 2012/0226627 A1 * | 9/2012 | Yang | G06Q 30/018 705/347 |
| 2014/0012909 A1 * | 1/2014 | Sankar | G06Q 50/01 709/204 |

* cited by examiner

*Primary Examiner* — Jennifer To
*Assistant Examiner* — Liang Li
(74) *Attorney, Agent, or Firm* — Perkins Coie LLP

(57) ABSTRACT

A method of operation of a social filter system includes: identifying a user with a user account; identifying a socially connected account from the user account, the socially connected account having a social association; selecting a content of interest from a content store of contents of interest based on the social association; and sending the content of interest for displaying on a user device.

15 Claims, 13 Drawing Sheets

*FIG. 9*

PROVIDING A LOCALITY VIEWPORT THROUGH A SOCIAL NETWORKING SYSTEM

FIELD OF INVENTION

This invention relates generally to a locality service, and in particular to providing a locality viewport through a social networking system.

BACKGROUND

In recent years, consumers have gotten used to looking up content information online. This includes both contents regarding physical localities such as points of interest, stores, and tourist attractions and contents regarding virtual and intellectual spaces such as games, TV shows, books, media, and video clips. In this application both physical locality content information and the virtual or intellectual media spaces shall be referred to as "locality."

Locality websites provide users with information regarding specific content information. Before the popularity of the Internet, information about localities was limited and hard to find. With the advent of the Internet, most consumers are overloaded with information about localities, both in the terms of physical locations and media content spaces.

The amount of information about localities is staggering. Different versions of information about the same locality may be redundant. Worse yet, different versions of information about the same locality may be inconsistent or out of date.

Existing locality services have tried to organize locality contents based on user reviews and user ranking. However, as a result of a flood of review and ranking, users may be exposed to irrelevant and uninteresting content while missing more relevant content that was previously presented.

Specifically, users of locality services do not have an effective tool to indicate whether locality items are relevant to them. Providing users with efficient methods of selecting and filtering locality information is valuable in providing a better user experience for users. However, existing systems have not provided users with tools or methods of presenting them with the most relevant locality information.

DISCLOSURE OF INVENTION

The present invention provides a method of operating a social filter system including: identifying a user with a user account; identifying a socially connected account from the user account, the socially connected account having a social association; selecting a content of interest from a content store of contents of interest based on the social association; and sending the content of interest for displaying on a user device.

The present invention also provides a method of operating a social filter system including: identifying a user with a user account; identifying contents of interest from a content store; generating a content set by filtering the contents of interest based on socially connected accounts from the user account, each instance of the contents of interest excluded when the socially connected accounts do not have a social association with the each instance; and sending the content set for displaying on a user device.

The present invention also provides a method of operating a social filter system including: identifying a user with a user account; receiving a focal region; identifying contents of interest from a content store within the focal region; generating a content set by filtering the contents of interest based on socially connected accounts from the user account, each instance of the contents of interest excluded when the socially connected accounts do not have a social association with the each instance; generating a visualization of the content set including a pin for each instance of the contents of interest in the content set; and sending the visualization for displaying on a user device.

The present invention also provides a method of operating a social filter system including: identifying a user with a user account; identifying contents of interest from a content store; determining socially connected accounts each having at least a social association with at least one instance of the contents of interest; and sending the socially connected accounts for displaying on a user device.

The present invention also provides a method of operating a social filter system including: identifying a user with a user account; determining a socially connected account based on the user account, the socially connected account having a social association with a content of interest; retrieving a media object related to the content of interest; and sending the media object for displaying on a user device.

The present invention also provides a social filter system including: an account store for storing a user account; a connectivity store for determining a socially connected account based on the user account; a content store for storing a content of interest; an activity map for storing a social association from the socially connected account with the content of interest; and a web server for communicating with a user device including sending the social association for displaying on the user device.

The present invention also provides a method of operating a mobile locality viewport including: signing-in to a user account; receiving a user input specifying a focal region on a map; receiving a content set, each content of interest in the content set having a social association with a socially connected account of the user account and each content of interest within the focal region on the map; and displaying the content set on a visualization view.

Some embodiments of the invention have other aspects, elements, features, and steps in addition to or in place of what is described above. These potential additions and replacements are described throughout the rest of the specification

BRIEF DESCRIPTION OF THE DRAWINGS

FIG. 9 is another example of the viewport of FIG. 1 in the friend view for displaying information about a single instance of a social connection account.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The present invention relates to methods of performing social filtering on contents of interest to provide a more compact and more relevant set of information for a social locality viewport displaying the filtered contents of interest. The present invention can utilize social connections and social activities of a social network to configure a social filter that can uniquely customize locality visualizations on the social locality viewport for each social network user. For example, the social locality viewport can be specifically designed as a mobile locality viewport, displaying only a compact and relevant list of contents of interest to the users.

The social locality viewport has the advantage of visualizing for the users relevant contents of interest based on their social connections. For example, in a friends view of the social locality viewport, the user can see social associations by their friends with particular contents of interest within a region or category. This can help a user determine for him/herself who is a trust-worthy person to talk to regarding the contents of interest. For another example, the social locality viewport can include an inquiry module to pre-populate a message to send to a "friend" who has a social association with a particular content of interest. For yet another example, the social locality viewport can include an explorer view for a user to browse through media files related to contents of interest associated with the user's friends. This can help the user define and locate what contents spark the user's interest with help of their friends to reduce the number of media files presented to the user.

Figure 1:
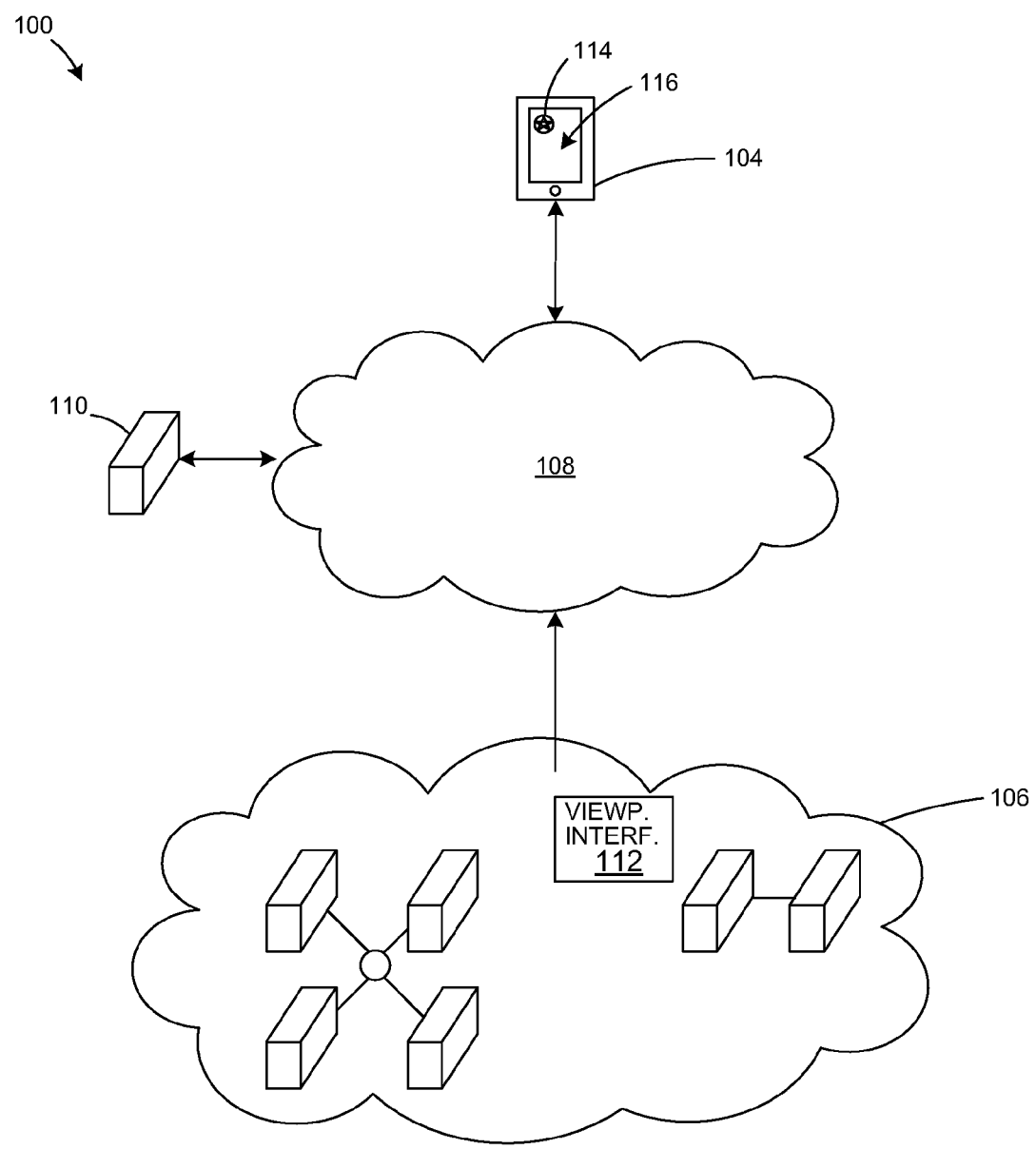
FIG. 1 illustrates a social filter system, in accordance with an embodiment of the invention.

FIG. 1 illustrates a social filter system 100, in accordance with an embodiment of the invention. The social filter system 100 can include a user device 104 connected to a social network system 106 via a network channel 108.

The user device 104 comprises one or more computing devices that can receive user input and can transmit and receive data via the network channel 108. In one embodiment, the user device 104 is a conventional computer system executing, for example, a Microsoft Windows-compatible operating system (OS), Apple OS X, and/or a Linux distribution. In another embodiment, the user device 104 can be a device having computer functionality, such as a personal digital assistant (PDA), mobile telephone, smart-phone, etc. The user device 104 is configured to communicate via the network channel 108. The user device 104 can execute an application, for example, a browser application that allows a user of the user device 104 to interact with the social network system 106. In another embodiment, the user device 104 interacts with the social network system 106 through an application programming interface (API) that runs on the native operating system of the user device 104, such as iOS and ANDROID.

In one embodiment, the network channel 108 uses standard communications technologies and/or protocols. Thus, the network channel 108 can include links using technologies such as Ethernet, 802.11, worldwide interoperability for microwave access (WiMAX), 3G, 4G, CDMA, digital subscriber line (DSL), etc. Similarly, the networking protocols used on the network channel 108 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network channel 108 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

The user device 104 can also be connected to an external website 110 via the network channel 108. The user device 104 can also be connected with the social network system 106 and request content from a viewport interface module 112. The external website 110 can access an application programming interface (API) of the social network system 106. The external website 110 can utilize a social plugin of the social network system 106 to access all of the social contents within the social network system 106. The external website 110 can also run across the social network system 106 via iFrames.

While the user device 104 is connected to the social network system 106, the viewport interface module 112 can respond to the request from the user device 104 by determining one or more of the content of interest 114 relevant to the user of the user device 104 for displaying on a viewport 116 of the user device 104. The viewport 116 is a graphical user interface of the user device 104.

Overview of the Social Network System 106

The social network system 106 offers its users the ability to communicate and interact with other users of the social network system 106. Users join the social network system 106 and add connections to a number of other users to whom they desire to be connected. Users of the social networking system 106 can provide information describing themselves, where the information is stored in user profiles. For example, users can provide their age, gender, geographical location, education history, employment history and the like. The information provided by users may be used by the social networking system 106 to direct information to the user. For example, the social networking system may recommend social groups, events, and potential friends to a user.

In addition to declarative information provided by users, the social network system 106 also record users actions on the social filter system 100. The recording of these actions are governed by privacy settings based on a user's preference that dictates what the social network system 106 can and cannot record. These actions include communications with other users, sharing photos, interactions with applications that operate on the social networking system, such as a social gaming application, responding to a poll, adding an interest, and joining an employee network. The social network system 106 can also be able to capture external website data that is accessed by its users. This external website data may include websites that are frequently visited, links that are selected, and other browsing data. Information about users, such as interests in particular other users and applications relative to past history of recorded actions can be generated through analysis and machine learning by the social networking system 106.

The social network system 106 can also attempt to infer information about its users. The social network system 106 can analyze posted content by users that include keywords, such as "wedding." Location information may be gathered from content items posted by users to infer a home location of the user. As a result, the social network system 106 can infer certain profile attributes of a user, such as geographic location, educational institutions attended, and age range, by analyzing the user's connections and their declared profile information. Inferring profile attributes are further discussed in "Inferring User Profile Information," U.S. application Ser. No. 12/916,322, filed on Oct. 29, 2010, which is hereby incorporated by reference.

The social network system 106 can also enable users to explicitly express interest in a concept, such as celebrities, hobbies, sports teams, books, music, and the like. These interests may be used in a myriad of ways, including targeting advertisements and personalizing the user experience on the social networking system by showing relevant stories about other users of the social network system 106 based on shared interests. In one embodiment, the social network system 106 can compute affinity scores for users' interests either explicitly expressed or otherwise inferred on the social network system 106 and use these affinity scores in ranking new content items that will be published in news feeds, or communication channels on the social network system 106, for the users. Affinity scoring with coefficients are further discussed in "Contextually Relevant Affinity Prediction in a Social Networking System," U.S. application Ser. No. 12/978,265, filed on Dec. 23, 2010, and "Top Friend Prediction for Users in a Social Networking System," U.S. application Ser. No. 13/093,744, filed on Apr. 25, 2011, which are both incorporated by reference.

Figure 2:
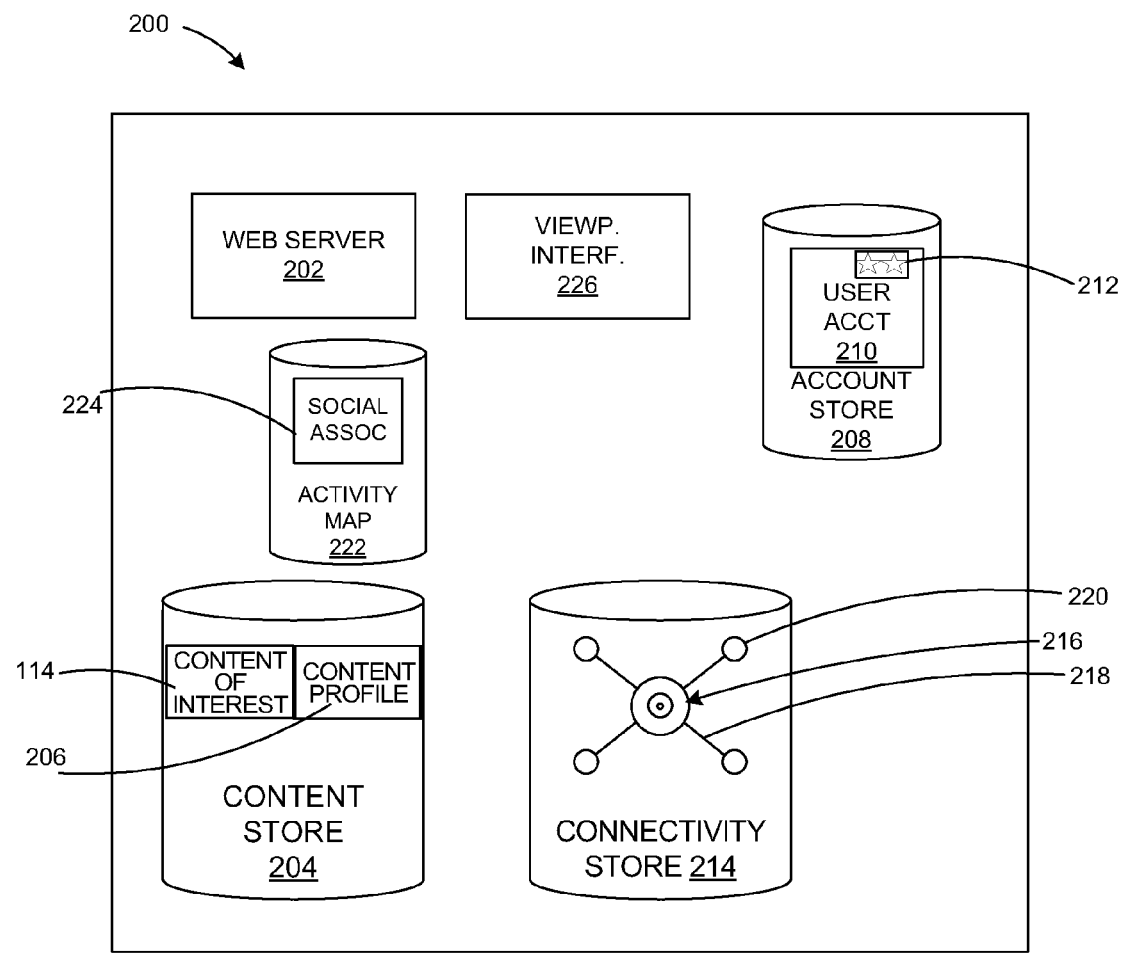
FIG. 2 is an example of a block diagram of a social network system.

Referring now to FIG. 2, therein is shown an example of a block diagram of a social network system 200. The social network system 200, can be for example, the social network system 106 of FIG. 1.

The social network system 200 can include one or more methods of generating and displaying a viewport, such as the viewport 116 of FIG. 1 for the user device 104 of FIG. 1. The one or more methods can be implemented by components, storages, and modules described below. The social network system can include also one or more further methods of updating the viewport based on user interactions on the user device 104. The one or more further methods can be implemented by modules described below.

The modules can be implemented as hardware modules, software modules, or a combination thereof. For example, the modules described can be software modules implemented as instructions on a non-transitory memory capable of being executed by a processor or a controller on a machine described in FIG. 13.

The storages, each labeled as a "store", described below are hardware components for storing digital data. Each of the store can be a single physical entity or distributed through multiple physical devices. Each of the stores can be on separate physical device or share the same physical device or devices.

The social network system 200 can include additional, fewer, or different modules for various applications. Conventional components such as network interfaces, security functions, load balancers, failover servers, management and network operations consoles, and the like are not shown so as to not obscure the details of the system.

The social network system 200 can include a web server 202. The web server 202 is a device for linking the social network system 200 via a network, such as the network channel 108, to one or more user devices, such as instances of the user device 104. The web server 202 can serve web pages, as well as other web related content, such as Java, Flash, XML, and so forth. The web server 202 may provide the functionality of receiving and routing messages between the social network system 200 and a user device, such as the user device 104. For example, these messages can be instant messages, web messages, queued messages (e.g., email), text and SMS (short message service) messages, or messages sent using any other suitable messaging technique. The user can send a request to the web server 202 to upload information, for example, images or videos that are stored in a content store 204. Additionally, the web server 202 may provide API functionality to send data directly to native user device operating systems, such as iOS, ANDROID, webOS, and RIM.

The social network system 200 can include the content store 204. The content store 204 is a non-transitory storage medium for storing a content of interest, such as the content of interest 114 of FIG. 1 and a content profile 206. The content store 204 can store multiple instances of the content of interest 114 and the content profile 206. The content of interest 114 can be, for example, a location or region identifiable through a map. The content of interest 114 can also be, for example, a media type passive or interactive, such as videos, books, photos, games, or a combination thereof. The content profile 206 includes entries of information related to a content of interest, such as the content of interest 114. The content profile, for example, can include an address, a phone number, a like, a content publication date, or a content category type.

The social network system 200 can include an account store 208. The account store 208 is a non-transitory storage medium for storing a user account 210. The user account 210 can be based on a user registration with the social network system 200. The user account 210 can include a profile. The profile can include privacy settings about how contents of the user account 210 can be used by the social filter system 100 to display information on the viewport 116. The user account 210 can include a favorites list 212.

The social network system 200 can include a connectivity store 214. The connectivity store 214 can be a non-transitory storage medium for storing a connectivity graph 216 of the user account 210. The connectivity graph 216 is defined as a mapping of relationships amongst two or more instances of the user account 210. For example, the connectivity graph 216 can represent a social connection between a socially connected account 220 and the user account 210. The socially connected account 220 is defined as another instance of a user account that is connected to the user account 210 by a stored association on the social network system 200. While it is illustrated that the socially connected account 220 is directly connected to the user account 210 within only one degree of separation, it is understood that the socially connected account 220 can be defined as within two, three, or more degrees of social connection with the user account 210. The socially connected account 220 can also be known as a "friend" within the social network system 200.

The content store 204 can include an activity map 222. The activity map 222 is a non-transitory storage medium for storing a social association 224. The social association 224 is a record of an interaction between the social network system 200 and the socially connected account 220 involving a content of interest, such as the content of interest 114. The social association 224 can include mentions, likes, offline/real world interactions, tagging people, notes, status updates, reviews, or a combination thereof. For status updates, notes, and reviews, the content of interest can be identified by semantic analysis. Through semantic analysis, whether the text includes a negative or positive review of the content of interest can also be determined. The activity map 222 can store the social association 224 between an instance of the socially connected account 220 and a content of interest, such as the content of interest 114.

The activity map 222 includes nodes connected by edges that are stored on the social network system 200. Nodes include users and objects of the social network system 200, such as web pages embodying concepts and entities. Edges connect the nodes. Edges, such as the social association 224, represent a particular interaction between two nodes, such as when a user expresses an interest in a news article shared by another user about "America's Cup." The activity map 222 can record interactions between users of the social network system 200 as well as interactions between users and objects of the social network system 200 by storing information in the nodes and edges that represent these interactions.

The activity map 222 can be stored as a graph. Each edge of the graph can be referred to as a graph action. Each node of the graph can be referred to as a graph object. Custom graph object types and graph action types may be defined by third-party developers as well as administrators of the social network system 200 to define attributes of the graph objects and graph actions. For example, a graph object for a movie can have several defined object properties, such as a title, actors, directors, producers, year, and the like. A graph action type, such as "purchase," may be used by a third-party developer on a website external to the social network system 200 to report custom actions performed by users of the social network system 200. In this way, the activity map 222 may be "open," enabling third-party developers to create and use the custom graph objects and actions on external websites.

For example, a graph object for a restaurant can have several defined object properties, such as a store name, culinary type, zip code, and the like. A graph action type, such as "reviewed" or "visited," can be used by a third-party developer on a website external to the social network system 200 to report custom actions performed by users of the social network system 200.

Third-party developers may enable users of the social network system 200 to express interest in web pages hosted on websites external to the social network system 200. These web pages may be represented as page objects in the social network system 200 as a result of embedding a widget, a social plug-in, programmable logic or code snippet into the web pages, such as an iFrame. Any concept that can be embodied in a web page may become a node in the activity map 222 on the social network system 200 in this manner. As a result, users may interact with many objects external to the social network system 200 that are relevant to a keyword or keyword phrase, such as "Justin Bieber." Each of the interactions with an object may be recorded by the social network system 200 as an edge. Enabling third-party developers to define custom object types and custom action types is further described in a related application, "Structured Objects and Actions on a Social Networking System," U.S. application Ser. No. 13/239,340 filed on Sep. 21, 2011, which is hereby incorporated by reference.

These edges, such as the social association 224, can be a user action of a socially connected account, such as a recommendation, a check-in, a photo tag, a nearby geographical tag, an interaction, a post, an action, or a combination thereof. For discussion purposes the social association 224 has been limited to positive interactions, but negative interactions, such as a crossing out an advertisement or closing a news feed story, can also be recorded. Such negative interactions can be used in any ranking of the content of interest in the social filter system 100 to decrease the degree of relevancy of the content of interest.

The social association 224 is considered related to or associated with a content of interest if the social association 224 is an edge in the activity map 222 connected to the content of interest 114 as a node. The activity map 222 can store one or more of the social association 224 for each of the content of interest. The activity map 222 can also be specific to an user account. In that case, the activity map 222 can store one or more of the social association 224 for each of the socially connected account 220.

The social network system 200 can include a viewport interface module 226, such as the viewport interface module 112 of FIG. 1. The viewport interface module 226 is for sending pages related to a content of interest for the user account 210 for displaying on a user device, such as the user device 104.

Figure 3:
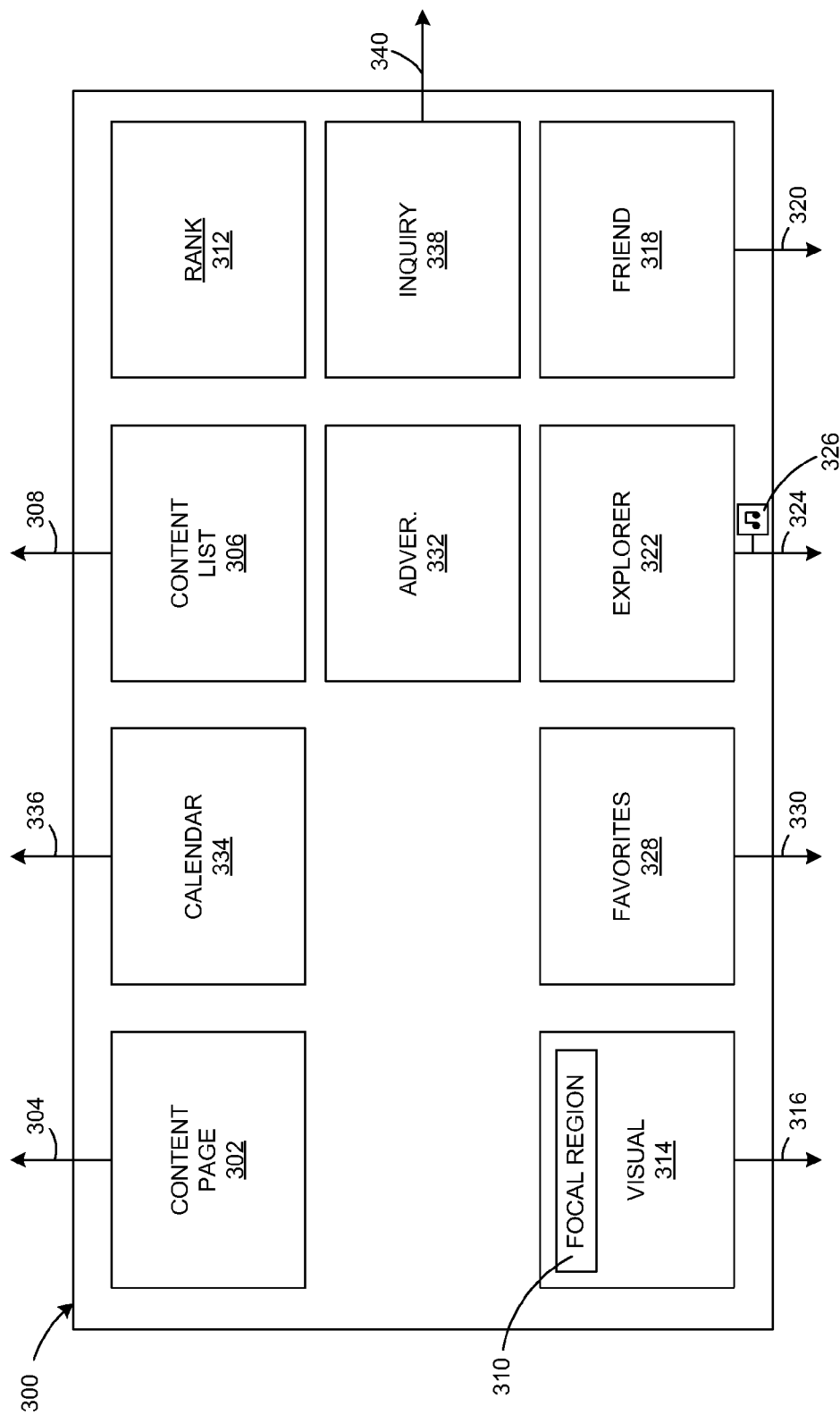
FIG. 3 is an example of a block diagram of a viewport interface module.

Referring now to FIG. 3, therein is shown an example of a block diagram of a viewport interface module 300, such as the viewport interface module 112 of FIG. 1 or the viewport interface module 226 of FIG. 2.

The viewport interface module 300 can include a content page module 302. The content page module 302 is for generating and sending the content page 304 to a user device with social information, such as the user device 104. The content page 304 can include a display of a content of interest and social associations from user accounts related to the content of interest, such as the content of interest 114 of FIG. 1 and the social association 224 of FIG. 2 respectively.

Figure 6:
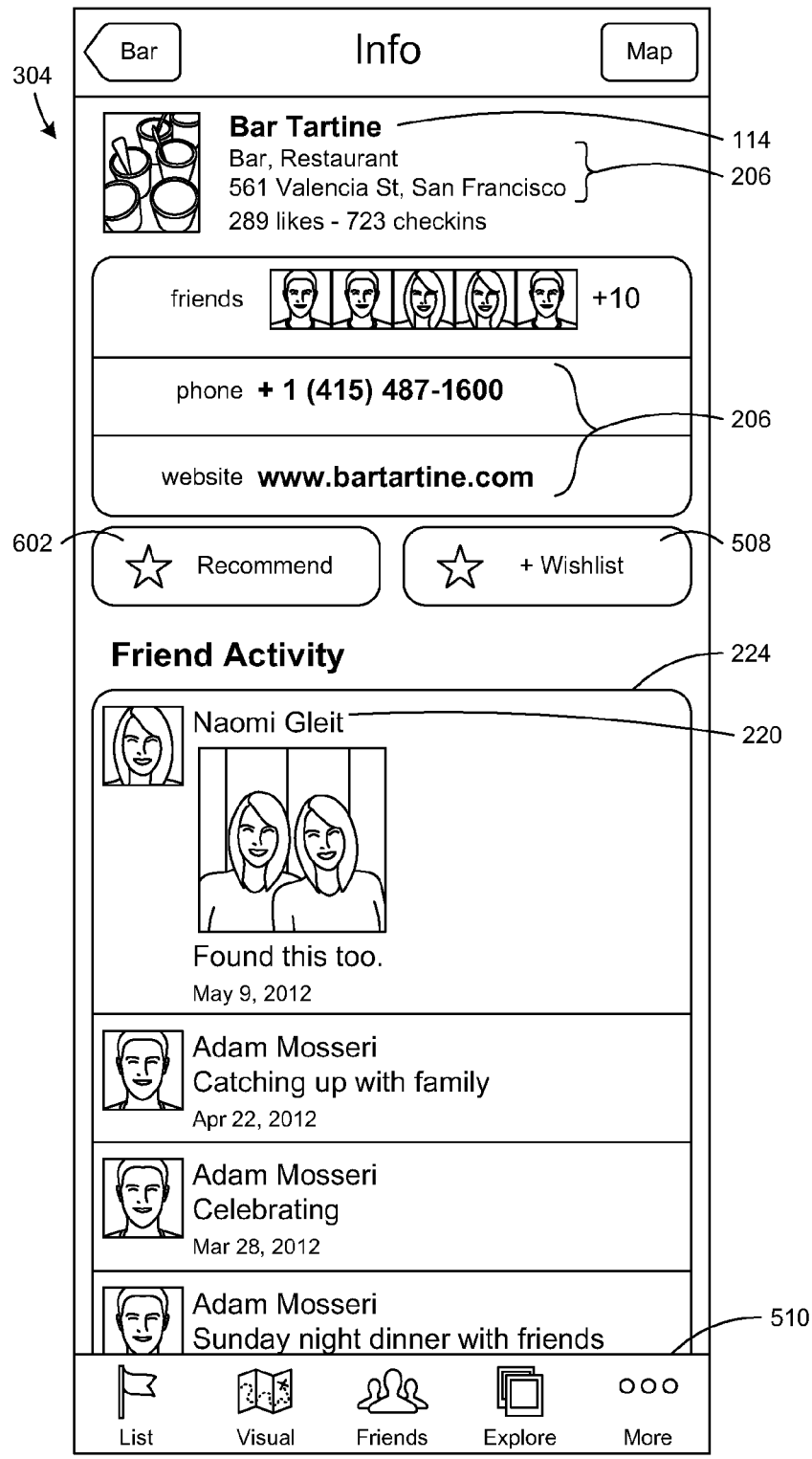
FIG. 6 is an example of the viewport of FIG. 1 displaying a content page.

For example, the content page 304 can be for the content of interest of the "New York City." The content page 304 can include not only tourism information of New York City, but also "friends" of the user account who have interacted with New York City via some form of social associations, such as posting about New York City on his/her wall or having recommended New York City in a social network system. FIG. 6 includes further example of the content page 304.

Figure 5:
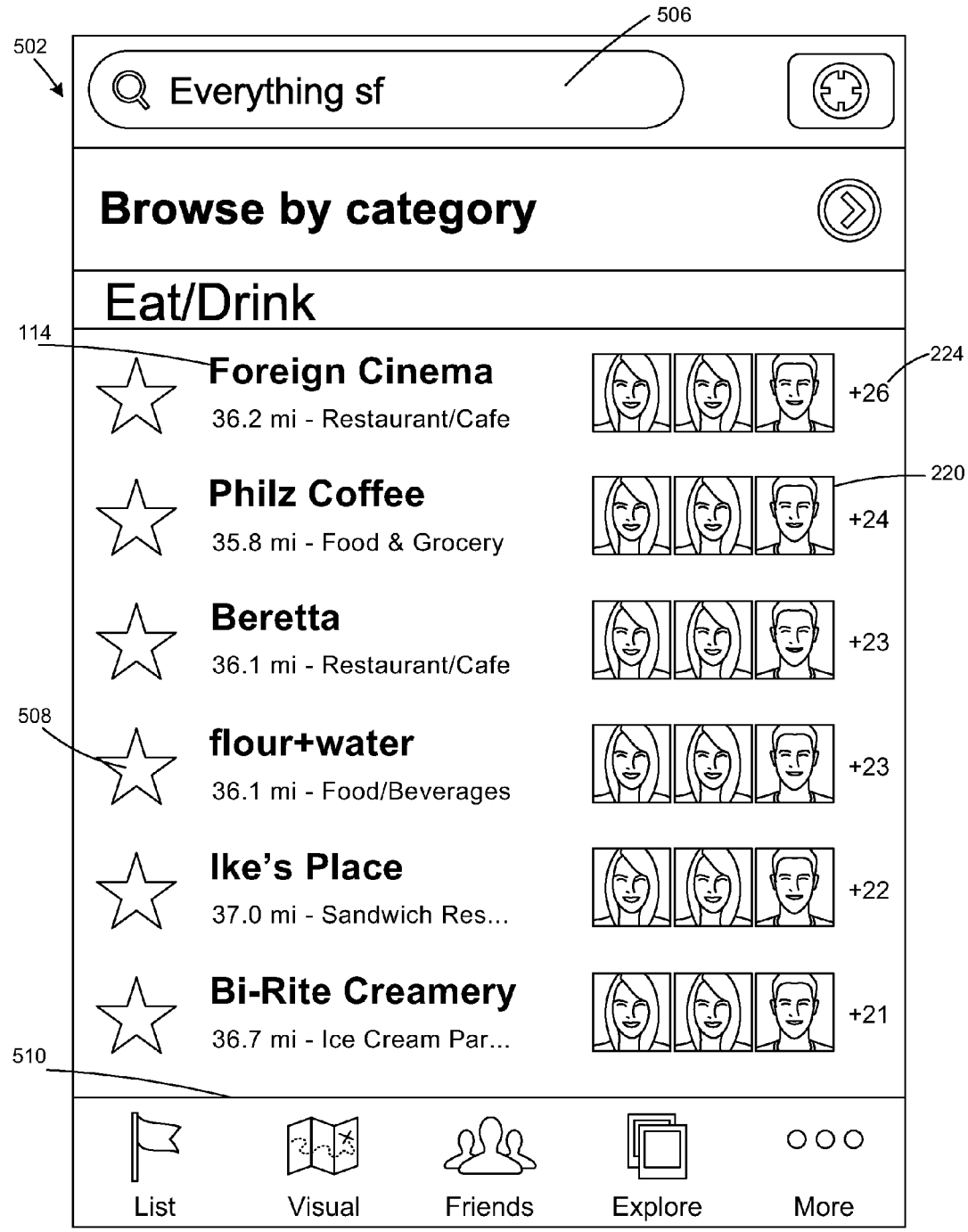
FIG. 5 is an example of a viewport of FIG. 1 in a list view.

The viewport interface module 300 can include a content list module 306. The content list module 306 is for generating and sending a content set 308 to a user device, such as the user device 104 of FIG. 1. The content set 308 is a list of contents of interest that is relevant to a user account, such as the user account 210 of FIG. 2. The content list module 306 can determine the content set 308 from the content store 204 and the user account. The content list module 306 can serve as a social filter to present to the user device only a subset of contents of interest, such as a subset of all instances of the content of interest 114 of FIG. 1 from the content store 204 of FIG. 2 that may be relevant to the user account. FIG. 5 includes an example of displaying the content set 308.

Relevancy can be determined by the social connections of the user account. For example, the content list module 306 can generate the content set 308 by filtering a content store, such as the content store 204, for any content of interest where a socially connected account has a social association with the content of interest. For example, from the content store, the contents of interest that are associated with the "friends" of the user account can be included in the content set 308. Associations such as check-ins or purchases can be used to determine if a socially connected account or a "friend" is associated with the content of interest. Examples of how the socially connected accounts can be associated with the content of interest are described in the applications incorporated by reference herein.

The content list module 306 can be limited to only a focal region 310. For example, the focal region 310 can be determined by a current location of the user device, where the current location is automatically determined by the user device and sent over to the social network system 106. The focal region 310 can be a physical region such as a city, a zip code, or a space within a distance radius of a location. The focal region 310 can also be a virtual region, such as a specific subscription from a video website or a music store application.

The content set 308 can be categorized by types of the content of interest. For example, the content set 308 can be categorized by events, places, people, genre, media type, or active date. The content set 308 can also be sorted. Each of the contents of interest, such as the content of interest 114, in the content set 308 can be sorted by date, by number of the socially connected accounts associated with the content of interest, number of the social associations corresponding to the content of interest, or a combination thereof. The socially connected accounts, for example, can include the socially connected account 220.

The viewport interface module 300 can include a rank module 312. The rank module 312 is for ranking each instance of the content of interest, such as the content of interest 114 in the content set 308 for display on the viewport 116. The rank module 312 can rank based on a total number of the socially connected accounts that are associated with each of the content of interest. The rank module 312 can rank based on the total number of the social associations for each of the content of interest. The rank module 312 can rank based on a number of check-ins, a number of recommendations, a number of recent social associations, or a combination thereof. The time threshold to be considered a "recent" social association can be set by user setting in the user account, dynamically set by the user, or pre-programmed in a viewport interface, such as the viewport interface 112. The rank module 312 can also rank based on analytics of posts created by the socially connected account on a social network system, such as the social network system 200 of FIG. 2, where the post has an association with the content of interest. For example, the rank module 312 can rank the content set 308 based on number of check-ins of the socially connected account who has recommended the content of interest. The ranking can then be used to order the content set 308 as displayed on a viewport, such as the viewport 116 of FIG. 1.

The viewport interface module 300 can include a visual module 314. The visual module 314 is for generating and sending a visualization view 316 of the content set 308 to be displayed on the user device. The visual module 314 can also keep track of the focal region 310 by storing the focal region 310 on a social network service, such as the social network system 200, or on a user device, such as the user device 104. For example, the visualization view 316 can be a map of the focal region 310. By default, the focal region 310 can be centered around a Global Positioning System (GPS) location of the user device. The visual module 314 is capable of sending the visualization view 316 to the user device, and allowing the user device to interact with the visualization view 316, including, for example, zooming, changing scope, panning, or rotating. An example of the visualization view 316 is provided in FIG. 7.

The visualization view 316 can have a maximum number of the contents of interest to display. The contents of interest shown in the visualization view 316 can be determined by the visual module 314, such as by ranking from the highest number of instances of the socially connected accounts having the social association related to the content of interest. The contents of interest shown in the visualization view 316 can also be from the content set 308 from the content list module 306. Each of the content of interest can also be ranked by the number of the social associations or the most recent date of a social association associated with the content of interest. Any of the content of interest that ranks below the maximum number to display can be excluded from the visualization view 316. The ranking can be performed by the rank module 312.

The viewport interface module 300 can include a friend module 318. The friend module 318 is for generating and sending a friend view 320 to the viewport on the user device. The friend view 320 can display the socially connected accounts based on at least the following criteria: (1) the socially connected accounts having a social association within the focal region 310 of the visualization view 316; (2) the socially connected account who has above a threshold number of social associations with the content of interest; (3) the socially connected account who has checked-in, "liked", or recommended more than a threshold number of the content of interest in the focal region 310 of the visualization view 316; or a combination thereof.

In one embodiment, the friend view 320 provides an interface for the user account to find the socially connected account who is a specific person who has similar taste to the user of the user account. The friend view 320 can uncover the relevant content set 308 based on the socially connected account. For example, the friend view 320 can show all of the places that the user of the socially connected account has visited in the city that the user of the user account is living in. For another example, the friend view 320 can show all of the restaurants that the user of the socially connected account has recommended on the social network system in a city that the user account has designated. An example of the friend view 320 is provided in FIG. 8 and FIG. 9.

In another embodiment, the friend view 320 provides an interface for the user account 210 to find the socially connected account who is an expert of the focal region 310 or of the content of interest 114. The social association stored on the social network system provides a way for the social network system to identify people who not only recommend the content of interest, but also have interacted with the content of interest many times previously to become experts. This view can be suggested or recommended to a user based on coefficient data as described in the patent incorporated by reference herein, such as U.S. application Ser. No. 12/978,265. Determining whether another user account can be an expert or an influencer in the social network is further discussed in "UTILIZE EXPERTS AND INFLUENCERS IN A SOCIAL NETWORK," U.S. application Ser. No. 13/040,158, filed on Mar. 3, 2011, which is hereby incorporated by reference.

The viewport interface module 300 can include an explorer module 322. The explorer module 322 is for generating and sending an explorer view 324 to the viewport on the user device. The explorer view 324 can display a media object 326 related to the content of interest. The media object 326 is defined as any digital content capable of being presented by a digital device. The explorer view 324 can allow for browsing of one or more of the media object 316 related to each of the content of interest in the content set 308. For example, the explorer view 324 can include pictures posted by the socially connected account about the content of interest. For another example, the explorer view 324 can include pictures posted on a page for the content of interest as stored on the social network system. The explorer view 324 can limit the number of the media object 326 displayed to only media objects related to contents of interest associated with the socially connected account, to a specific content of interest, or to the contents of interest within the focal region 310 as specified in the visualization view 316. A media object is related to a content of interest if the media object describes the content of interest in some way.

The explorer view 324 can allow the user to browse through one or more of the media object 326 quickly with social context. The explorer view 324 has been discovered with the advantage of allowing users to find out what they are interested in based on their friends' endorsements. This is even though the users have no idea what kind of the content of interest to search for.

The user can input a category query to limit the number of the media object 326 shown. For example, the user can limit the media objects shown to "restaurants." The explorer view 324 can then show media objects of restaurants taken at the city that the user of the user account is living in. An example of the explorer view 324 is provided in FIG. 10.

The viewport interface module 300 can include a favorites module 328. The favorites module 328 is for generating and sending a favorites view 330 to the viewport on the user device. The favorites view 330 can include a display of a favorites list, such as the favorites list 212 of FIG. 2. The favorites list is defined as a list of the content of interest deemed to be of interest by a user of the user account. The favorites list can be displayed when the user account is logged into the social network system. The favorites list 212 of the user account can also be displayed on the viewport of a friend's device when the socially connected account is logged into the social network system. The favorites in the favorites list 212 can be dynamically updated as the social network system is updated. An example of the favorites view 330 is provided in FIG. 11.

The viewport interface module 300 can include an advertisement module 332. The advertisement module 332 can be coupled to the rank module 312, the visual module 314, or the explorer module 322. The advertisement module 332 is for promoting a special instance of the content of interest in the viewport. For example, while in any of the views described in the application, the advertisement module 332 can highlight a content of interest, such as a lounge bar called "New Blues". The highlighting of the "New Blues" can include displaying a link, an address, or a picture of the lounge bar within the views in the viewport.

The advertisement module 332 can increase the ranking of a content of interest in the content set 308. For example, a user browsing through furniture stores can see a list of furniture stores in the views described in this disclosure. The advertisement module 322 can bump up a paid advertiser's furniture store in the list. The advertisement module 332 can also highlight in various manners, such as providing a visual emphasis or notification of the special instance of the content of interest in the visualization view 316 or the explorer view 324. For example, the paid advertiser's furniture store can be bolded or enlarged. The advertisement module 332 can also insert the special instance in the viewport where the special instance has no social connection with the user account. For example, a furniture store that has not been visited by a "friend" of the user account can be inserted into the list of furniture stores that has some amount of social interactions with "friends" of the user account.

The viewport interface module 300 can include a calendar module 334. The calendar module 334 is for generating and sending a calendar view 336 to the viewport on the user device. The calendar view 336 can include a display of a calendar or timeline, with time-stamped information of social associations associated with the content of interest, such as the content of interest 114. For example, the calendar view 336 can include a timeline of check-ins of the socially connected account. For another example, the calendar view 336 can include a timeline of the social associations related to the content of interest.

In one embodiment, the calendar view 336 can provide the user with relevant timing information to predict time-based relevancy of the user's interest in the content of interest. For example, the calendar view 336 can help the user to determine the best time to visit a restaurant by looking at whether the "friends" of the user frequent the restaurant on weekdays or weekends. For another example, the calendar view 336 can help the user determine trending information about the increasing or decreasing popularity of the content of interest, such as a bar. In that example, the user can see a decrease in social associations with the bar in the recent months, indicating that the bar is becoming unpopular. Optionally, the trending information and time-based relevancy can also be determined automatically by the calendar module 334 for displaying on the viewport. For example, the number of new social associations or change in number of social associations each day can be displayed in the calendar view 336.

The viewport interface module 300 can include an inquiry module 338. The inquiry module 338 is for generating and sending an inquiry 340, through the social network system, relayed to the socially connected account. The inquiry 340 is defined as a pre-populated message regarding the content of interest. The inquiry module 338 can be activated in any of the views generated by the viewport interface module 300, such as by clicking a button or an icon next to the socially connected account. The inquiry module 338, when activated through the viewport, can automatically generate the inquiry 340 to the socially connected account with pre-defined text regarding the content of interest. For example, when the user account has identified the content of interest as "Paris" and a socially connected account is socially connected to "Paris", the inquiry 340 can be generated with a text message stating: "Hi, I would like to ask for your recommendation about where to go in Paris because the social network system has notified me that you are familiar with Paris." The inquiry 340 can be generated by inserting the content of interest, which is "Paris" in this example, into a text string template, such as the rest of the text other than "Paris" in the example.

The inquiry 340 can also include a link to a content page, a name of the socially connected account, a link to and information about a media object of the content of interest, or any combination thereof. For example, the inquiry 340 can state: "Hi (Joe Smith), I would like to ask for your recommendation about where to go in (Paris) because the social network system has notified me that you are familiar with (Paris). In particular, I am looking at the (picture) you have taken on (Aug. 1, 2000). Here is the link to a page I am looking at for (Paris): (http://linktocontentofinterest.com). Here is what I am looking at from your page: (http:// linktomediaobject])." Items in parentheses above are examples of the name of the socially connected account, the link to and information about the media object related to the content of interest (e.g., Paris), and the link to the content page that can be inserted in to a pre-generated template for the inquiry 340.

Figure 4:
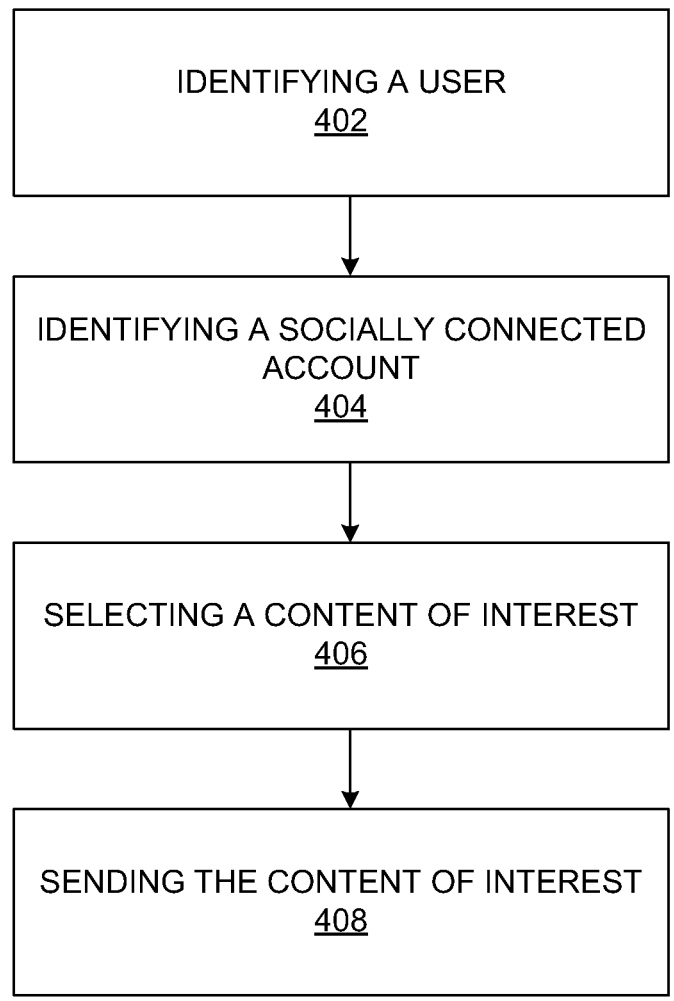
FIG. 4 is a flow chart of a method of operation of the social filter system in a further embodiment of the present invention.

Referring now to FIG. 4, therein is shown a flow chart of a method 400 of operation of the social filter system 100 in a further embodiment of the present invention. The method 400 includes: identifying a user with a user account in a method step 402; identifying a socially connected account from the user account, the socially connected account having a social association in a method step 404; selecting a content of interest from a content store of contents of interest based on the social association in a method step 406; and sending the content of interest for displaying on a user device in a method step 408.

Referring now to FIG. 5, therein is shown an example of the viewport 116 of FIG. 1 in a list view 502. A list view 502 can include a content search input 506. The content search input 506 is for receiving user inputs, such as user inputs to be sent to the viewport interface module 300 of FIG. 3 for socially filtering a content set, such as the content set 308 of FIG. 3. Although it has been illustrated that the content search input 506 is a text box for input in FIG. 5, it is understood that the search input can be any user interface element for user input.

The content list module 306 can generate and send back a list of contents of interest, such as the content of interest 114, to be displayed on the list view 502. In this example, the contents of interest are different categories of places of interest, although it is understood other types of contents can be listed instead of places. Third party system can query the viewport 116 to enhance their website with social context. The third party can ask the social network to identify the user and provide the social associations or the list view 502 back to the third-party site, such as the external website 110.

The list view 502 can display the content set received from the content list module 306 of FIG. 3. The content set 308 can be further refined and filtered in the list view 502 based on category of the content of interest, a socially connected account, such as the socially connected account 220, or a focal region, such as the focal region 310 of FIG. 3. For example, the content of interest in the content set 308 that is not associated with the socially connected account 220 can be removed from the content set 308. For another example, contents of interest in the content set 308 not within a focal region defined by the visualization module 314 can be removed from the content set 308.

For each of the content of interest, the list view 502 can include a list of the socially connected accounts, each having a social association related to the content of interest. A count of the number of the social associations, such as the social association 224, can be displayed next to the content of interest. Each of the socially connected account can be displayed as an icon, an avatar, a username, a thumbnail, or a combination thereof. For example, the socially connected account can be displayed as a thumbnail photo as in FIG. 5. This thumbnail photo can be replaced by an icon, such as a tiny human figure, or a username of the socially connected account, such as "Joe Smith."

The list view 502 can include next to each of the content of interest an add-to-favorite button 508. In one embodiment, the add-to-favorite button or icon 508 is an interactive button that can change states between highlighted or otherwise selected and not highlighted. When highlighted, the add-to-favorite button 508 denotes that the content of interest is added to a favorites list, such as the favorites list 212 of FIG. 2 for the user account 210 of FIG. 2. The favorites list can be displayed in a different view of the viewport 116, for example, in FIG. 11.

The content list module 306 can track a plurality of the social association 224 of a plurality of the socially connected account 220 in the list view 502 for each of the content of interest 114. Then the content list module 306 can sort the content set 308 based on the number of the social association 224 for each of the content of interest 114. The list view 502 can include the tracked number of the social association 224 for each of the content of interest 114.

For example, the content list module 306 of FIG. 3 can track a number of the socially connected accounts related to each of the content of interest. Then the content list module 306 can sort the content set 308 based on the number of the socially connected accounts for each of the content of interest. The number of the socially connected accounts can be displayed in the list view 502. For example, in FIG. 5, for the content of interest "Foreign Cinema," the number of the socially connected account 224 is "26."

The viewport 116 can include a menu bar 510. The menu bar 510 is an interactive portion of the viewport 116 that allows for toggling between different views. For example, FIG. 5 shows that the list view 502 is activated.

Referring now to FIG. 6, therein is shown an example of the viewport 116 of FIG. 1 displaying a content page, such as the content page 304. The content page 304 can be a view of the viewport 116 for displaying information about a particular content of interest, such as the content of interest 114. For example, the content page 304 can be generated by the content page module 302 of FIG. 3.

The content page 304 can include a title of the content of interest. The content page 304 can include a content profile, such as the content profile 206. The content page 304 can also include a relevant subset of socially connected accounts connected to the user account, such as the socially connected account 220 of the user account 210 of FIG. 2. The relevant subset includes the socially connected accounts having at least a social association, such as the social association 224, that is related to the content of interest. A total number of the social associations can also be linked or displayed. A finer detail of the social association can also be displayed. For example, a number of times the socially connected account has checked-in can be displayed. For another example, the total number of the socially connected accounts each having recommended the content of interest can be displayed.

The content page 304 can include a display of recent ones or all of the social associations related to the content of interest. The time threshold for determining if a social association is recent can be user-defined or pre-programmed. The content page 304 can also include a display of a pattern of the social association. For example, the content page 304 can display that the socially connected account has checked-in every Friday for the last three weeks.

The content page 304 can include posts from the socially connected account or from the public regarding the content of interest. For example, the content page 304 can include a post about a friend's experience in eating at the content of interest, the content of interest being a restaurant. The post can be about negative, positive comments, or both, including specific areas that are more encouraging or disappointing. For example, encouraging comments can include "love the place!", "I would like to see that again!", or "highly recommended." For another example, discouraging comments can include "hate that place!", "it was so so", or "I would not do it again."

The content page 304 can include a recommend button 602. The recommend button 602 is an interactive button for recording a recommendation of the content of interest from the user account to an activity map, such as the activity map 222 of FIG. 2. The recommendation can be stored as a social association associated with the content of interest. The content page 304 can also include the add-to-favorite button 508 for adding the content of interest to a favorites list, such as the favorites list 212 of FIG. 2. The favorite button 508 can also store a social association between the user account and the content of interest in the activity map. When storing a social association, such as a recommendation or a favorite tag, the social association is stored with a reference to the user account and the content of interest it is related to.

Figure 7:
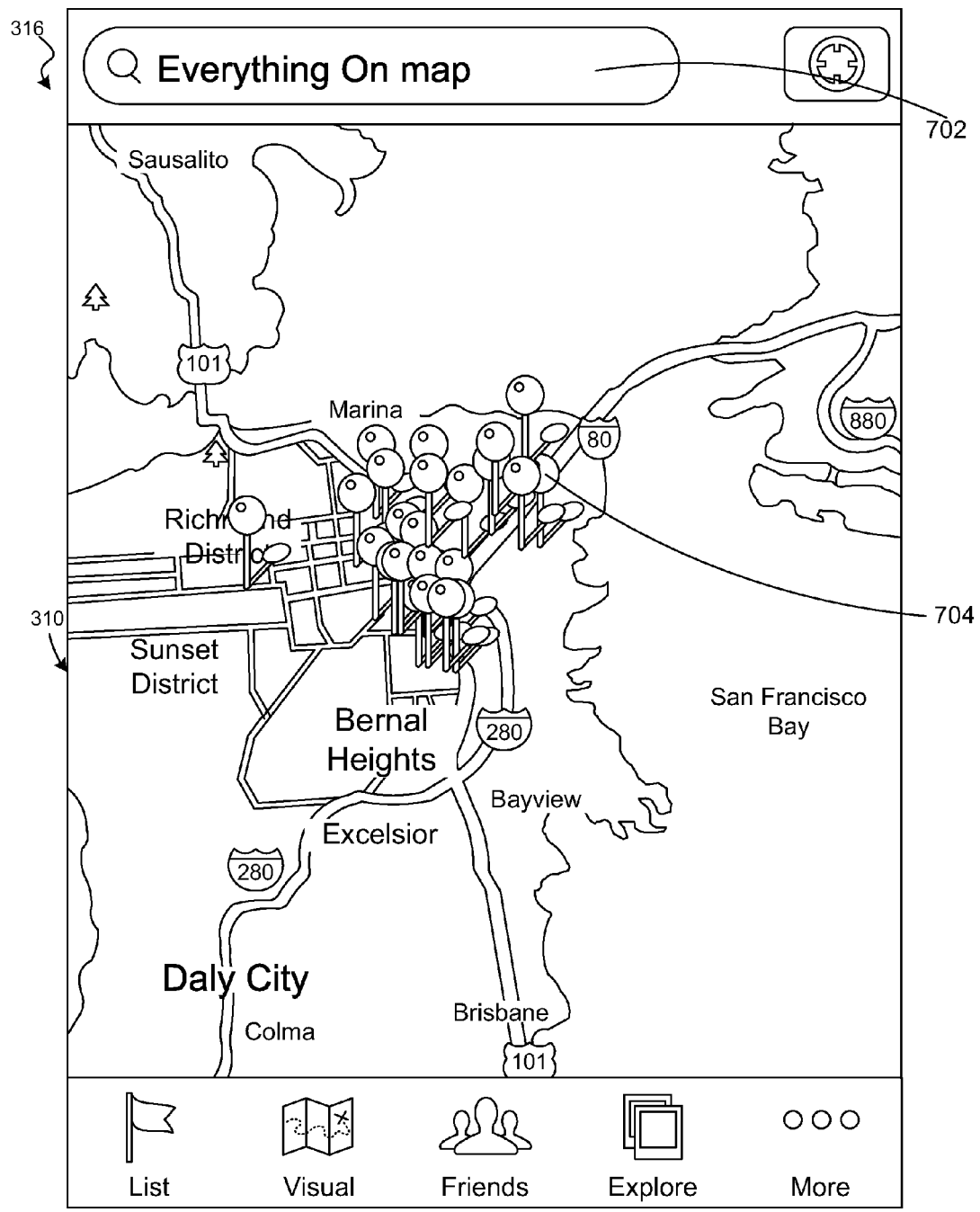
FIG. 7 is an example of the viewport of FIG. 1 in a visualization view.

Referring now to FIG. 7, therein is shown an example of the viewport 116 of FIG. 1 in a visualization view. For example, the visual view can be the visualization view 316. The visualization view 316 can be a view of the viewport 116 for displaying information about contents of interest, such as the content of interest 114 of FIG. 1. The visualization view 316 can display information about the contents of interest in relation to one another. In this example, the visualization view can display the contents of interest in a map, showing the contents of interest in a geographical region in relation to one another. The visualization view 316 can display a content set, such as the content set 308 of FIG. 3 as provided by the content list module 306 of FIG. 3.

In one embodiment, the visualization view 316 can include a visual search input 702. Although it has been illustrated that the visual search input 702 is a text box for input in FIG. 7, it is understood that the search input can be any user interface element for user input. The visual search input 702 is for receiving inputs from the user to filter the contents of interest that are to be displayed on the visualization view 316. The visual search input 702 can be used to change a focal region, such as the focal region 310. For example, when the user enters "London" in the visual search input 702, the focal region 310 can change to a map space around London. The search input 702 can also be used to filter the contents of interest displayed. For example, if the user enters "Paris" in the visual search input 702, the visualization view 316 can zoom to a map of Paris. In this case, the map is the visualization view 316, and the focal region is the map area "Paris". For another example, if the user enters "Restaurant", the visualization view 316 can display only the contents of interest that are restaurants in the current map.

A pin 704 on the visualization view 316 can represent the content of interest. Although it has been illustrated that the pin 704 is a dot with a connector line in FIG. 7, it is understood that the pin 704 can be any icon or marker. The pin 704 can have different colors or size to denote different properties of the content of interest. For example, the pin 704 can be enlarged if more than a threshold number of socially connected accounts have social associations related to a content of interest on which the pin 704 is on, such as the socially connected account 220 of FIG. 2 having the social association 224 of FIG. 2 related to the content of interest 114.

Figure 8:
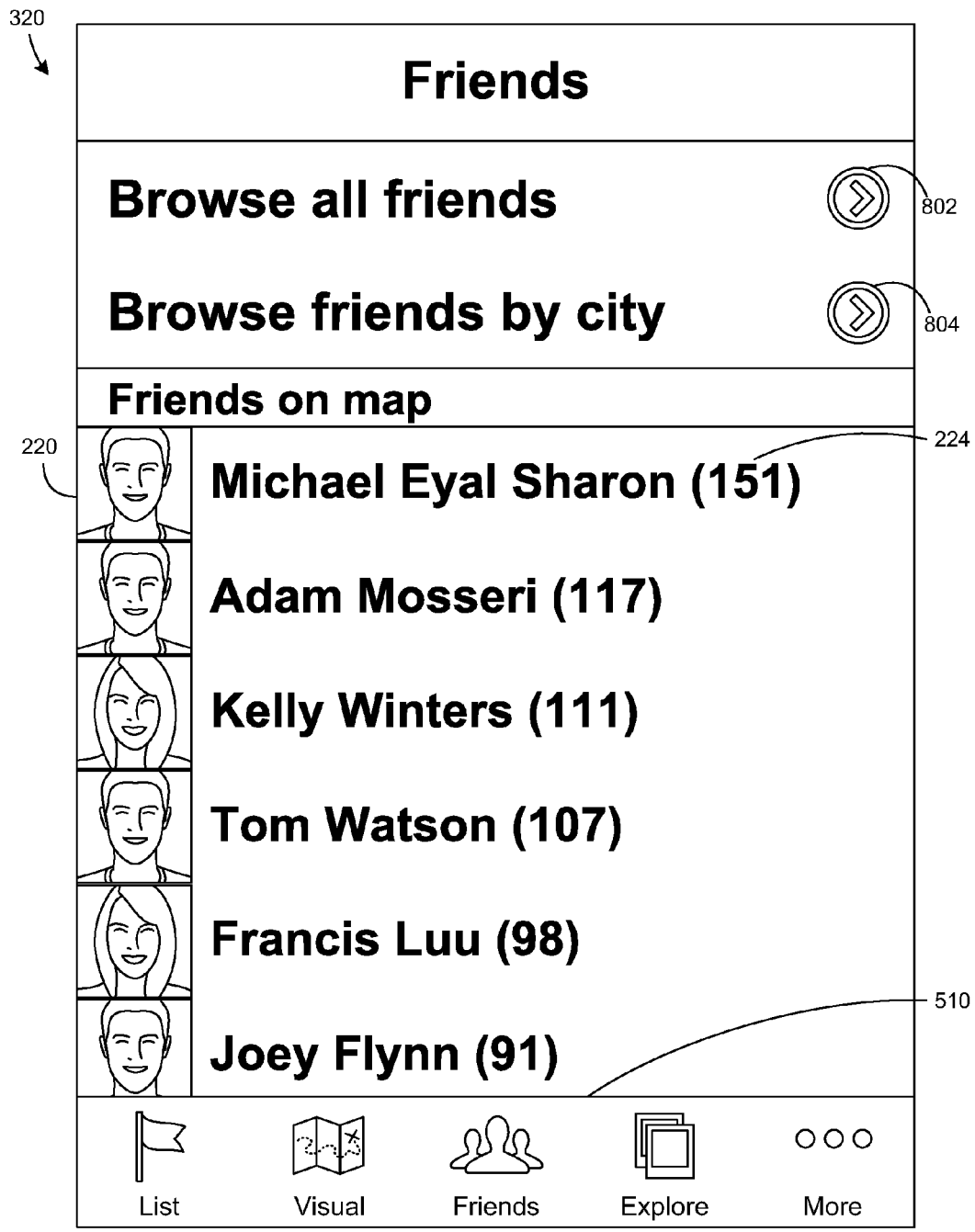
FIG. 8 is an example of the viewport of FIG. 1 in a friend view for displaying information about socially connected accounts.

Referring now to FIG. 8, therein is shown an example of the viewport 116 of FIG. 1 in a friend view for displaying information about socially connected accounts. For example, the friend view can be the friend view 320 of FIG. 3 for displaying information about the socially connected accounts, such as the socially connected account 220 of FIG. 2. The friend view 320 can be generated by the friend module 318 of FIG. 3. The friend view 320 can be associated with the visualization view 316 of FIG. 3 such that the friend view 320 can display a list of the socially connected accounts, each who has at least one social association, such as the social association 224 accounted for within the focal region 310 of FIG. 3 displayed by the visualization view 316. The number of instances of the social association within the visualization view 316 can be displayed next to an icon of the socially connected account.

The friend view 320 can include a button 802 to browse all of the socially connected accounts. For example, upon clicking the button 802, "friends" of the user account can be listed. The "friends" listed in this example are filtered such that only the "friends" who are associated with the selected content of interest are displayed.

The friend view 320 can also include a button 804 to browse only the socially connected accounts within the focal region, such as a city or a state. For example, upon clicking the button 804, "friends" who live or have lived in the focal region, can be listed. The "friends" listed in this example are filtered such that only the "friends" who are associated with the selected content of interest are displayed.

Figure 9:
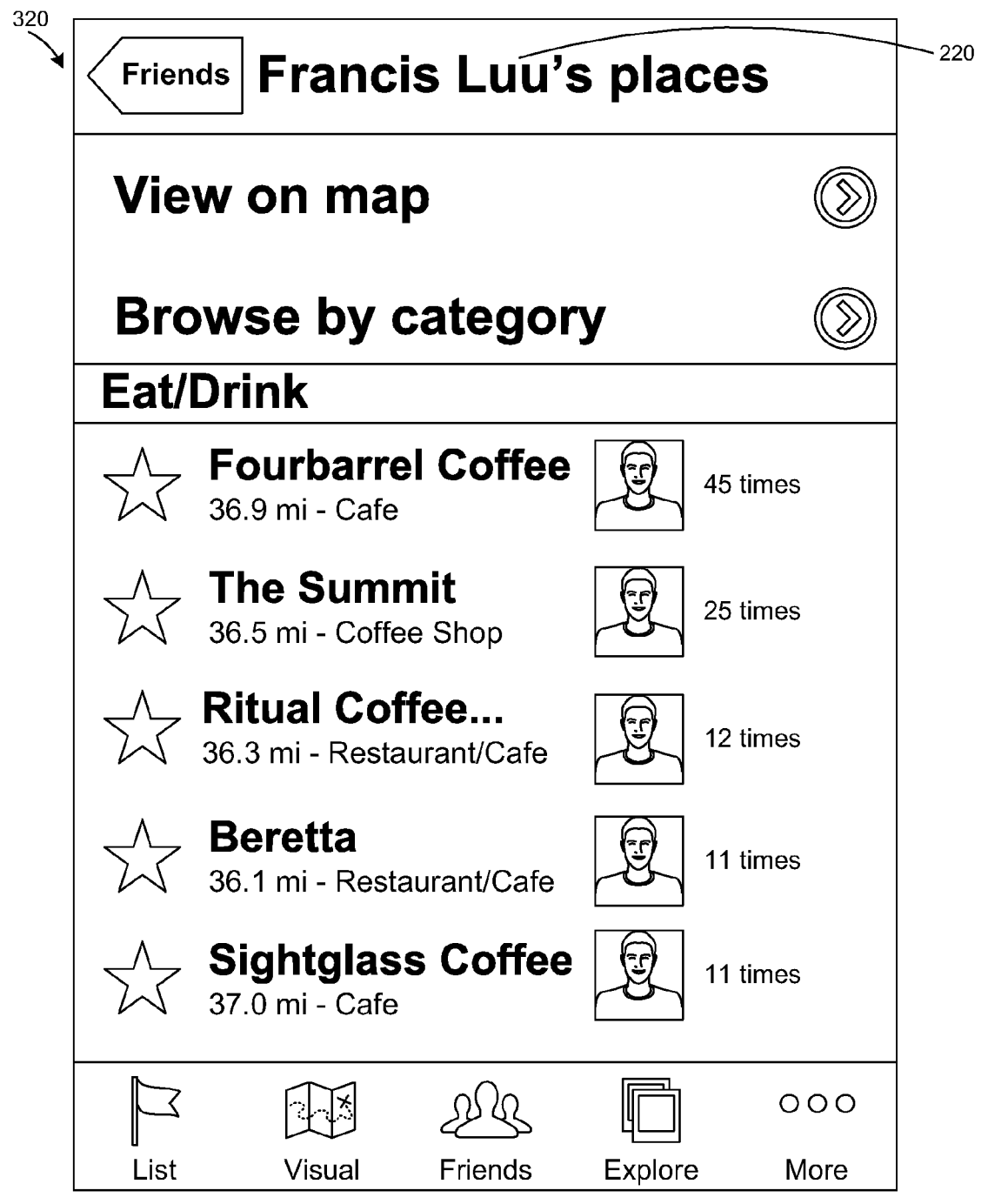

Referring now to FIG. 9, therein is shown another example of the viewport 116 of FIG. 1 in the friend view for displaying information about a socially connected account. For example, the friend view can be the friend view 320 of FIG. 3 for displaying information about a single one of the socially connected account 220 of FIG. 2.

This example of the friend view 320 can be generated by the friend module 318 of FIG. 3. In this example, the friend view 320 can include a list of contents of interest, such as the content of interest 114 of FIG. 1 corresponding at least one of the social association 224 of FIG. 2 for the socially connected account 220 of FIG. 2. This list of the contents of interest can be displayed in a list, displayed on the visualization view 316 of FIG. 3 such as a map, or can be displayed in separate lists categorized by types of the contents of interest.

Figure 10:
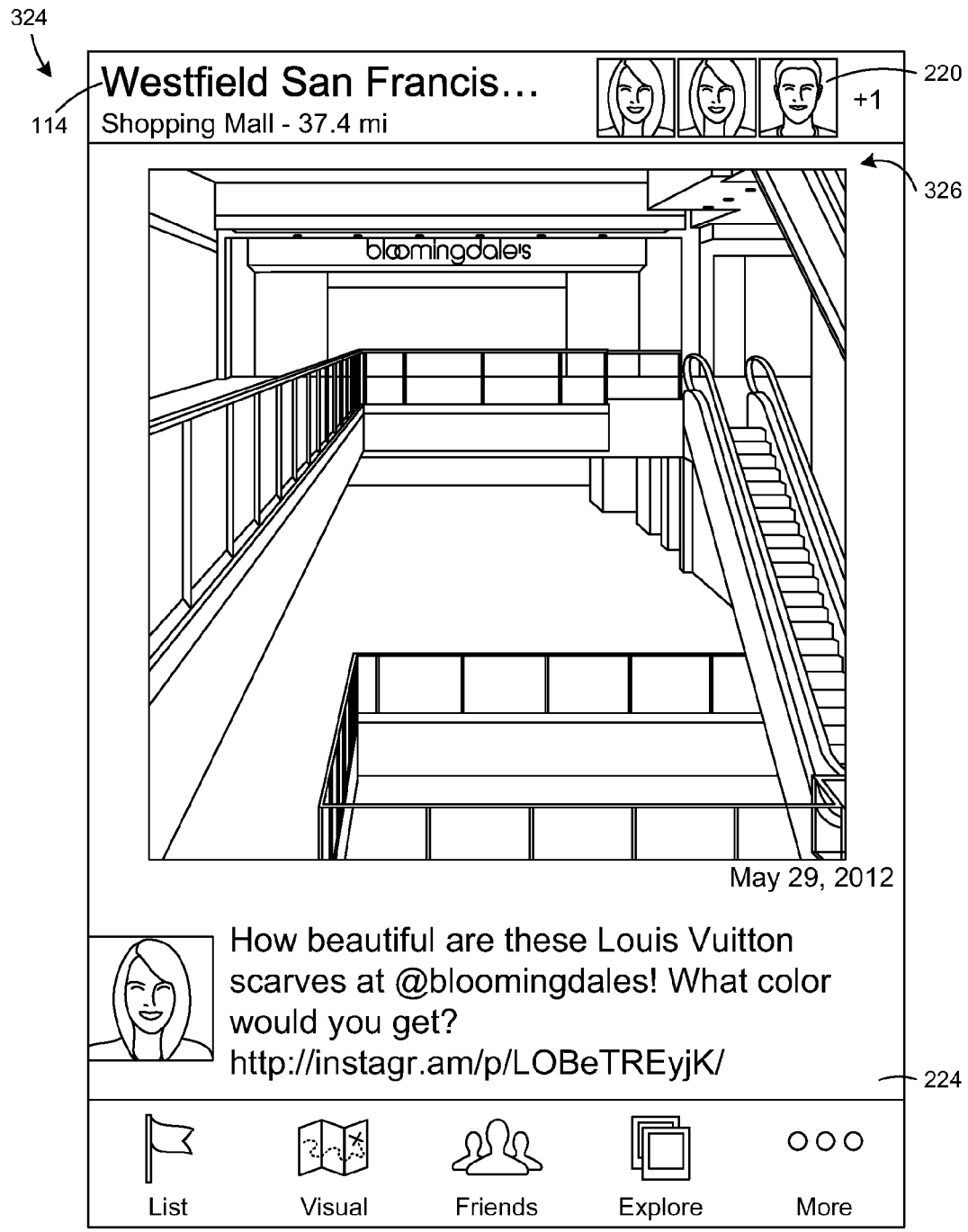
FIG. 10 is an example of the viewport of FIG. 1 in an explorer view of the viewport for displaying a media object related to a content of interest.

Referring now to FIG. 10, therein is shown an example of the viewport 116 of FIG. 1 in an explorer view for displaying a media object related to a content of interest. For example, the explorer view can be the explorer view 324 for displaying the media object 326 of FIG. 3 related to the content of interest 114 of FIG. 1.

The explorer view 324 can be generated by the explorer module 322 of FIG. 3. For example, the media object, such as the media object 326 can be audio, video, image, text, interactive text, interactive images, or a combination thereof. The browsing of the media object on the viewport 116 can be activated by a detected swipe on a user device, such as the user device 104 of FIG. 1, or can be activated by a timer.

The explorer view 324 can browse through different media objects. The order of the media objects can be sorted by date, such as date of creation, reported date, or date of upload. The explorer view 324 can be set to browse through the media objects related to a content set, such as the content set 308 of FIG. 3, where the content set is generated by on a category, a focal region, such as the focal region 310 of FIG. 3, a socially connected account, such as the socially connected account 220, or a social association, such as the social association 224. The explorer view 324 can sequence an order of the media objects by date of publication of each of the media objects.

The visual search input 702 of FIG. 7 can also limit the media objects displayed in the explorer view 324. For example, if "Ice Cream" was entered in the visual search input 702, the media objects displayed can be limited to any of the content of interest related to "Ice Cream" or any of the social association related to "Ice Cream". Instead of using the visual search input 702, the explorer view 324 can also include its own search box for performing the same functions described in this section. Search and retrieval of objects in the social network are further discussed in "Search and Retrieval of Objects in a Social Networking System," U.S. application Ser. No. 12/816,377, filed on Jun. 15, 2010, which is hereby incorporated by reference.

In one embodiment, the explorer view 324 has the advantage of being a browse-oriented interface for the content of interest with social filtering that minimizes times spent on irrelevant content. Accordingly, the explorer view 324 enjoys both the ease of use of a browse-oriented interface without the detriment of most other browse-oriented interfaces.

Figure 11:
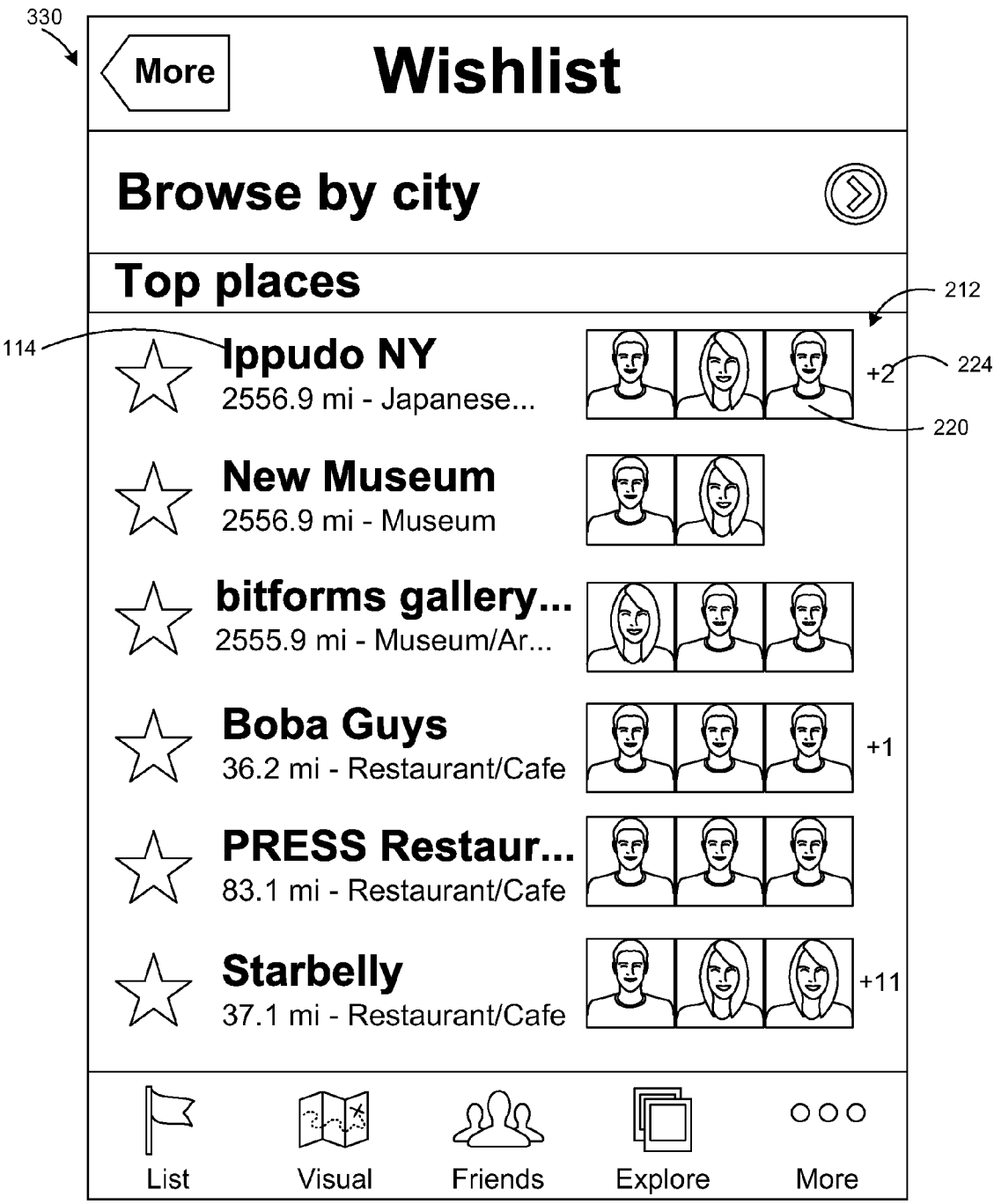
FIG. 11 is an example of the viewport of FIG. 1 in a favorites view of the viewport for displaying a favorites list associated with a user account.

Referring now to FIG. 11, therein is shown an example of the viewport 116 of FIG. 1 in a favorites view for displaying a favorites list associated with a user account, such as the favorites view 330 of FIG. 3 for displaying the favorites list 212 associated with the user account 210 of FIG. 2. The favorites view 330 can be generated by the favorites module 328 of FIG. 3. The favorites list can include the contents of interest that has been marked as a favorite, such as the content of interest 114. For each of the content of interest, a brief description of the content of interest can be included in the favorites view 330. For example, if the content of interest is a place, the number of miles or distance from a current location of a user device, such as the user device 104 of FIG. 1, to the content of interest can be displayed. The type of the content of interest can also be displayed, such as "Restaurant", "Museum", or "Cafe". Icons of socially connected accounts of the user account, such the socially connected account 220 of the user account 210, can be displayed next to each of the content of interest, where the socially connected account has a social association related to the content of interest. For example, the social association can be the social association 224.

Figure 12:
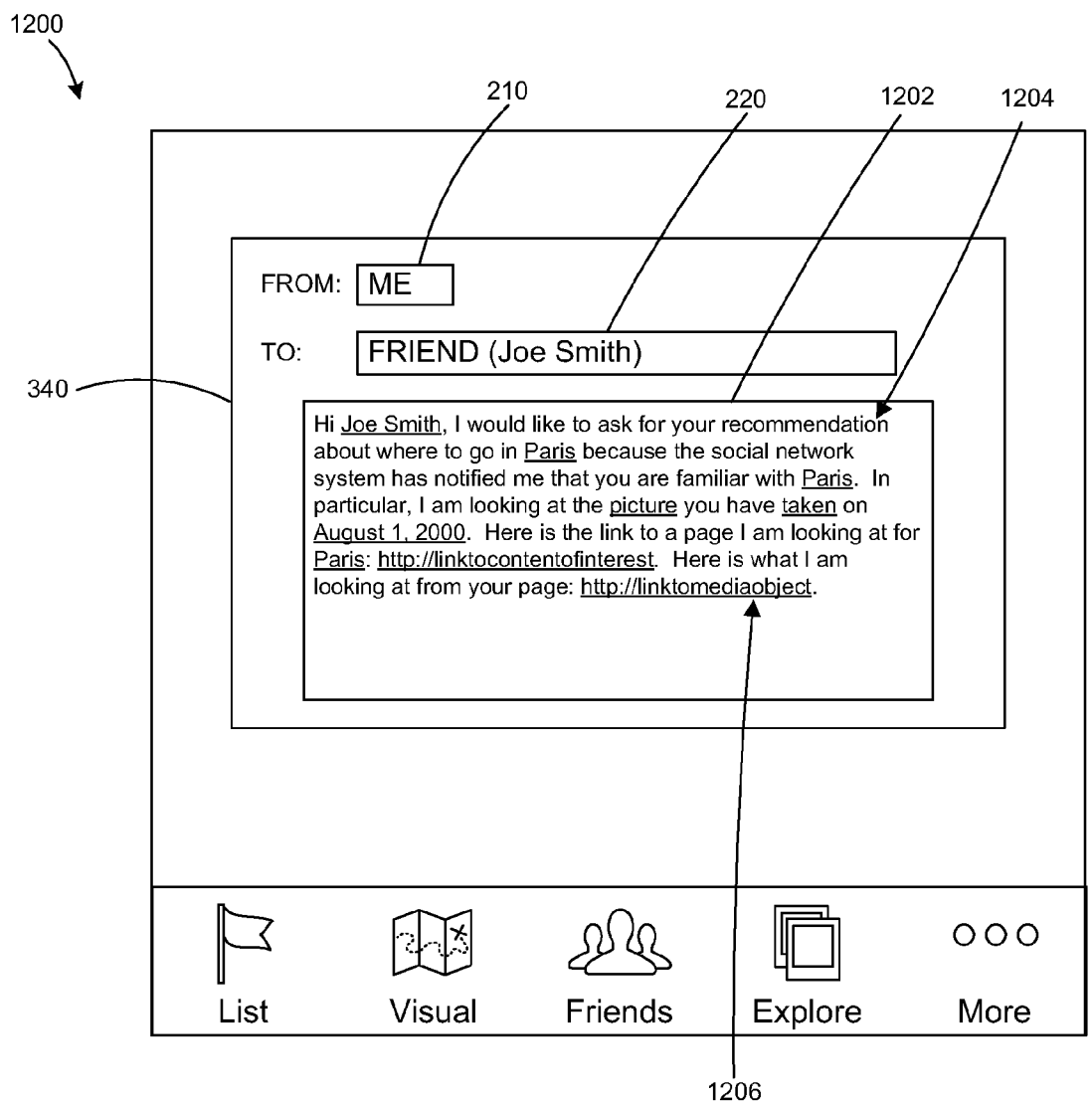
FIG. 12 is an example an inquiry message in the viewport of FIG. 1.

Referring now to FIG. 12, therein is shown an example an inquiry message in the viewport 116 of FIG. 1. For example, the inquiry message can be the inquiry message 340 of FIG. 3. The inquiry message can be embedded with the viewport as illustrated in FIG. 12. The inquiry message can also be in a pop-up window or an application call to open up an email client such as Microsoft Outlook™, Gmail™ Facebook™ Messages, or any combination thereof.

The inquiry message can include a field indicating a user account sending the inquiry message, such as the user account 210 of FIG. 2. The inquiry message can include a field indicating which socially connected account or accounts to send the inquiry message to, such as the socially connected account 220 of FIG. 2. The inquiry message can include a message text 1202. The message text 1202 can include a pre-determined text template 1204, such as the portion of the message text that is not underlined in the FIG. 12. The message text 1202 can also include an automatic filled portion 1206, such as the portion of the message text that is underlined in the FIG. 12.

For example, the pre-determined text template 1204 can include a general greeting as shown in FIG. 12. The automatic filled portion 1206 can include a content of interest that the user account is viewing, and a link to the content of interest page. For example, the content of interest can be the content of interest 114 of FIG. 1. The automatic filled portion 1206 can also include a reference to a media object that the user account is viewing, including the type of the media object, a link to the media object, how and when the media object is recorded, or any combination thereof. For example, the media object can be the media object 326 of FIG. 3. The automatic filled portion 1206 can also include a name of the socially connected account, such as "Joe Smith" as shown.

Figure 13:
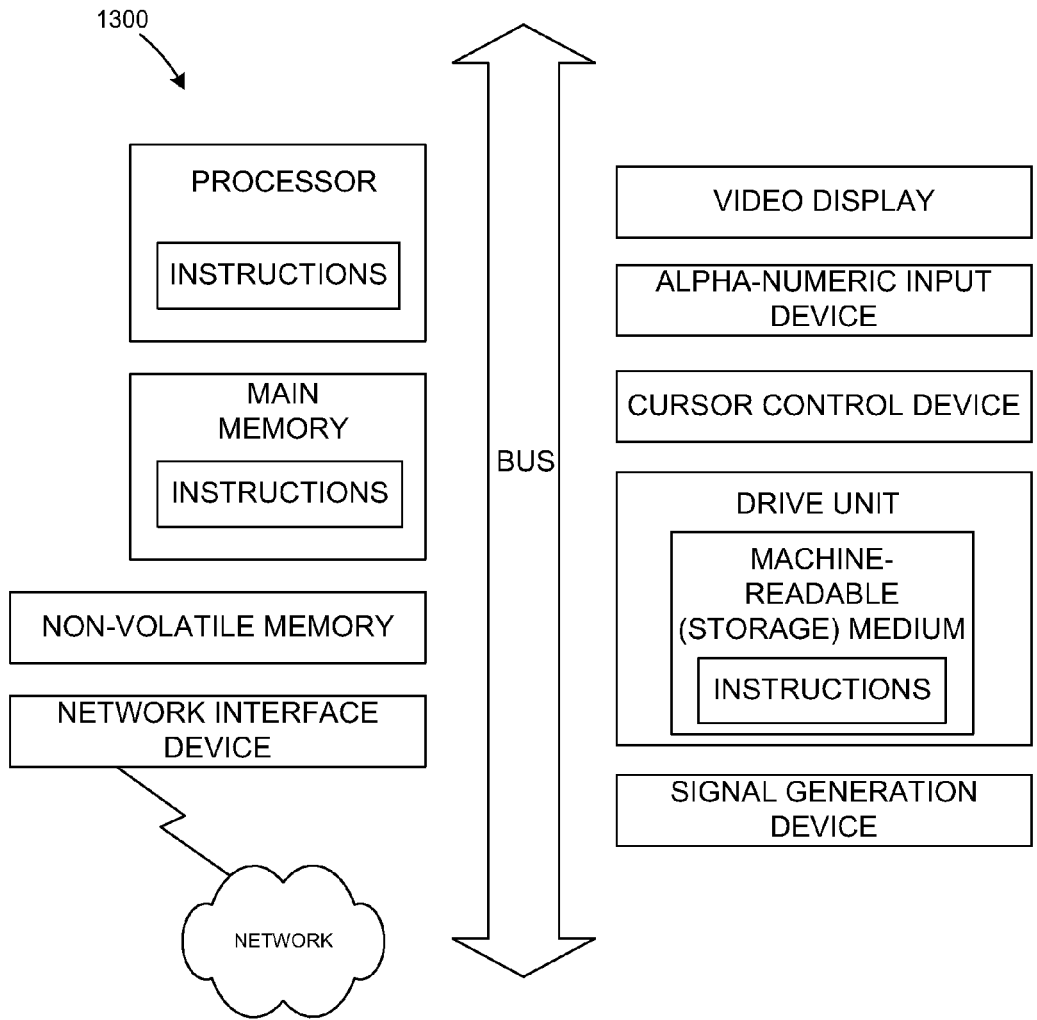
FIG. 13 is a diagrammatic representation of a machine in the example form of a computer system within which a set of instructions, for causing the machine to perform any one or more of the methodologies or modules discussed herein, may be executed.

Referring now to FIG. 13, therein is shown a diagrammatic representation of a machine in the example form of a computer system 1300 within which a set of instructions, for causing the machine to perform any one or more of the methodologies or modules discussed herein, may be executed.

In the example of FIG. 13, the computer system 1300 includes a processor, memory, non-volatile memory, and an interface device. Various common components (e.g., cache memory) are omitted for illustrative simplicity. The computer system 1300 is intended to illustrate a hardware device on which any of the components depicted in the example of FIGS. 1-11 (and any other components described in this specification) can be implemented. The computer system 1300 can be of any applicable known or convenient type. The components of the computer system 1300 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1300. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1300. The interface can include an analog modem, isdn modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 13 reside in the interface.

In operation, the computer system 1300 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The above description and drawings are illustrative and are not to be construed as limiting the invention to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

While processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method of operating a social filter system, comprising:
    identifying, via a computer system, a user account as an operator of a mobile locality viewport;
    identifying, via the computer system, contents of interest from a content store within a user-indicated focal region that represents an area within a map;
    identifying, via the computer system and from a social connectivity graph of a social networking system, socially connected accounts associated with the user account;
    generating, via the computer system, a content set by filtering the contents of interest based on the socially connected accounts, wherein each instance of the contents of interest is excluded when the socially connected accounts do not have a social association with the each instance;
    tracking, via the computer system, a number of the socially connected; accounts that have at least one engagement association among multiple types of engagement associations with a first content object in the content set, wherein said tracking includes incrementing the number of the socially connected accounts by how many of the socially connected accounts published content that tags the first content object in the social networking system;
    sorting, via the computer system, the first content object amongst the content set for display based at least on the number of the socially connected accounts;
    generating a calendar view of the social association of the socially connected accounts; and
    sending the calendar view for displaying on a user device.

2. The method of claim 1, wherein identifying the contents of interest from the content store includes identifying the contents of interest from a category designated by a search box.

3. The method of claim 1, further comprising:
    tracking a number of instances of the social association from the socially connected accounts for each instance of the contents of interest; and
    sending the number of instances of the social association for displaying on the user device.

4. The method of claim 1, further comprising:
    tracking a number of instances of the social association from the socially connected accounts for each instance of the contents of interest; and
    sorting the content set based on the number of instances of the social association for each instance of the contents of interest.

5. The method of claim 1, wherein the multiple types of engagement associations includes a check-in tag, a photo tag, a geographical tag, a post tag, or any combination thereof.

6. A computer system, comprising:
    a data memory storing executable instructions;
    one or more processors configured by the executable instructions to:
    identify a user account as an operator of a mobile locality viewport;
    identify contents of interest from a content store within a user-indicated focal region that represents an area within a map;
    identify, from a social connectivity graph of a social networking system, socially connected accounts associated with the user account;
    generate a content set by filtering the contents of interest based on the socially connected accounts, wherein each instance of the contents of interest is excluded when the socially connected accounts do not have a social association with the each instance;
    track a number of the socially connected accounts that have at least one engagement association among multiple types of engagement associations with a first content object in the content set, wherein said tracking includes incrementing the number of the socially connected accounts by how many of the socially connected accounts published content that tags the first content object in the social networking system;

sort the first content object amongst the content set for display based at least on the number of the socially connected accounts;

generate a calendar view of the social association of the socially connected accounts; and send the calendar view for displaying on a user device.

7. The computer system of claim 6, wherein the one or more processors are further configured to identify the contents of interest from a category designated by a search box.

8. The computer system of claim 6, wherein the one or more processors are further configured to:

track a number of instances of the social association from the socially connected accounts for each instance of the contents of interest; and send the number of instances of the social association for displaying on the user device.

9. The computer system of claim 6, wherein the one or more processors are further configured to:

track a number of instances of the social association from the socially connected accounts for each instance of the contents of interest; and sort the content set based on the number of instances of the social association for each instance of the contents of interest.

10. The computer system of claim 6, wherein the multiple types of engagement associations includes a check-in tag, a photo tag, a geographical tag, a post tag, or any combination thereof.

11. A non-transitory computer readable data storage memory storing computer-executable instructions that, when executed by a computing device, cause the computing device to perform a computer-implemented method, the computer-executable instructions comprising:

instructions for identifying, via a computer system, a user account as an operator of a mobile locality viewport;

instructions for identifying, via the computer system, contents of interest from a content store within a user-indicated focal region that represents an area within a map;

instructions for identifying, via the computer system and from a social connectivity graph of a social networking system, socially connected accounts associated with the user account;

instructions for generating, via the computer system, a content set by filtering the contents of interest based on the socially connected accounts, wherein each instance of the contents of interest is excluded when the socially connected accounts do not have a social association with the each instance;

instructions for tracking, via the computer system, a number of the socially connected accounts that have at least one engagement association among multiple types of engagement associations with a first content object in the content set, wherein said tracking includes incrementing the number of the socially connected accounts by how many of the socially connected accounts published content that tags the first content object in the social networking system;

instructions for sorting, via the computer system, the first content object amongst the content set for display based at least on the number of the socially connected accounts;

instructions for generating a calendar view of the social association of the socially connected accounts; and instructions for sending the calendar view for displaying on a user device.

12. The non-transitory computer readable data storage memory of claim 11, wherein instructions for identifying the contents of interest includes instructions for identifying the contents of interest from a category designated by a search box.

13. The non-transitory computer readable data storage memory of claim 11, wherein the computer-executable instructions further comprises:

instructions for tracking a number of instances of the social association from the socially connected accounts for each instance of the contents of interest; and instructions for sending the number of instances of the social association for displaying on the user device.

14. The non-transitory computer readable data storage memory of claim 11, wherein the computer-executable instructions further comprises:

instructions for tracking a number of instances of the social association from the socially connected accounts for each instance of the contents of interest; and instructions for sorting the content set based on the number of instances of the social association for each instance of the contents of interest.

15. The non-transitory computer readable data storage memory of claim 11, wherein the multiple types of engagement associations includes a check-in tag, a photo tag, a geographical tag, a post tag, or any combination thereof.

* * * * *